United States Patent
Grier et al.

(10) Patent No.: US 12,413,423 B2
(45) Date of Patent: Sep. 9, 2025

(54) LOCALHOST DIGITAL CERTIFICATE DISCOVERY AND RECONCILIATION

(71) Applicant: International Business Machines Corporation, Armonk, NY (US)

(72) Inventors: Billy Lee Grier, Austin, TX (US); Joseph Michael Spitzer, Rochester, MN (US); Christopher M. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 18/472,870

(22) Filed: Sep. 22, 2023

(65) Prior Publication Data
US 2025/0106043 A1 Mar. 27, 2025

(51) Int. Cl.
*H04L 9/32* (2006.01)

(52) U.S. Cl.
CPC .......... *H04L 9/3265* (2013.01); *H04L 9/3268* (2013.01)

(58) Field of Classification Search
CPC ............................ H04L 9/3265; H04L 9/3268
See application file for complete search history.

(56) References Cited

U.S. PATENT DOCUMENTS

| | | | |
|---|---|---|---|
| 6,513,116 B1 | 1/2003 | Valente | |
| 7,546,454 B2 | 6/2009 | Novack et al. | |
| 7,650,497 B2 | 1/2010 | Thornton et al. | |
| 7,937,583 B2 | 5/2011 | Thornton et al. | |
| 8,473,737 B2 | 6/2013 | Kikuchi | |
| 8,719,908 B1 | 5/2014 | Boniface et al. | |
| 8,738,902 B2* | 5/2014 | Yoo | H04L 61/45 726/10 |
| 9,614,833 B1* | 4/2017 | Rao | H04L 63/0823 |
| 9,917,844 B2 | 3/2018 | Fossen et al. | |
| 11,032,087 B2 | 6/2021 | Waldron et al. | |
| 11,444,786 B2 | 9/2022 | Shearer et al. | |
| 2006/0015729 A1* | 1/2006 | Novack | H04L 63/0823 713/173 |
| 2016/0323104 A1* | 11/2016 | Mayers | H04L 63/0407 |
| 2018/0205721 A1* | 7/2018 | Hirahara | H04L 9/3242 |
| 2021/0385243 A1 | 12/2021 | Ali-Ahmad et al. | |

FOREIGN PATENT DOCUMENTS

CN 115314495 A 11/2022

* cited by examiner

*Primary Examiner* — Hany S. Gadalla
(74) *Attorney, Agent, or Firm* — Yee & Associates, P.C.

(57) ABSTRACT

A computer implemented method is provided. A number of processor units identify a number of certificates for a device within a network to obtain a file path for each certificate. The number of processor units perform an internal scan of the device to obtain a port number for each active port associated with network protocol on the device. The number of processor units identify a certificate chain associated with each port number based on the network protocol for the device. The number of processor units compare content for each certificate from the number of certificates to the certificate chains for the device to generate a number of matches. The number of processor units generate a data structure including the file path of the certificate for each port on the device based on the number of matches.

20 Claims, 9 Drawing Sheets

Projects / cio-mici-portal-servers / Virtual machines / g44xr00009091 g44xr00009091 [Private] [East AZ 4] ○ Running

Created: Feb 21, 2023 9:54 am • Private cloud team: CIO SRE Team

[Actions ›]

| Overview | Access this VM | Certificates |

Certificates
IBM Certificate Authority

[🔍 Filter table]    [↻]    [New certificate +]

| Location | Type | Issuer | Not before | Expires after | Status |
|---|---|---|---|---|---|
| ‹ https://443/tcp/etc/pki/tls/certs/g44xr00009091_ ○ 404 2023-02-22T16:26:00Z_4794275.cer | (Discovered) | IBM INTERNAL INTERMEDIATE CA | Feb 21, 2023 | Feb 20, 2025 | Valid ⋮ |

Locations
Process    Port    Path
https    443/tcp    /etc/pki/tls/certs/g44xr00009091_
                        2023-02-22T16:26:00Z_4794275.cer

Key
rsaEncryption

Valid between
Feb 21, 2023 - Feb 20, 2025

Status
Valid

406

Subject
C = US, ST = Texas, L = Austin, O = ibm.com, OU = CIO,
CN = g44xr00009091.example.com, UID = C-R6TM897, mail =
mail@example.com

Issuer
C = US, O = International Business Machines Corporation,
CN = IBM INTERNAL INTERMEDIATE CA Items per page: 10 ⌄    1-1 of 1 items    1⌄ of 1 page  ▲▼

LOCALHOST DIGITAL CERTIFICATE DISCOVERY AND RECONCILIATION

BACKGROUND

The disclosure relates generally to an improved computer system and more specifically to a computer implemented method, apparatus, system, and computer program product for matching a certificate to a port on a device within a network.

Network security for verifying authenticity and identity are fundamental components of maintaining a secure and trustworthy digital environment. Specifically, verification of authenticity and identity are designed to ensure that entities communicating over the network are authentic as asserted.

One method used in network security to verify authenticity is the implementation of certificates. Certificates are cryptographic documents that are issued by trusted Certificate Authorities and serve as cryptographic proof of identity for an entity. The digital certificates contain several components. For example, certificates include public keys used for encryption and digital signatures. The certificate also includes an issuer's digital signature, generated using the private key from the Certificate Authorities. The digital signature serves as a seal of authenticity for verifying both the legitimacy of the certificate and endorsement from the Certificate Authorities for the entity's identity.

In this case, entities exchange certificates for mutual authentication when they communicate over a network. This mutual authentication process confirms that the entities on both ends of the communication are legitimate and can be trusted. In addition, each digital certificate is granted a specific validity period. Once the validity period expires, the digital certificate needs to be renewed to maintain validity.

SUMMARY

According to one illustrative embodiment, a computer implemented method for matching certificates with active ports on a device in a network is provided. A number of processor units identify a number of certificates for a device within a network to obtain a file path for each certificate. The number of processor units perform an internal scan of the device to obtain a port number for each active port associated with network protocol on the device. The number of processor units identify a certificate chain associated with each port number based on the network protocol for the device. The number of processor units compare content for each certificate from the number of certificates to the certificate chains for the device to generate a number of matches. The number of processor units generate a data structure including the file path of the certificate for each port on the device based on the number of matches. According to other illustrative embodiments, a computer system and a computer program product for predicting the next frame are provided.

BRIEF DESCRIPTION OF THE DRAWINGS

FIG. 4 is an illustration of a graphical user interface in accordance with an illustrative embodiment;

DETAILED DESCRIPTION

Figure 1:
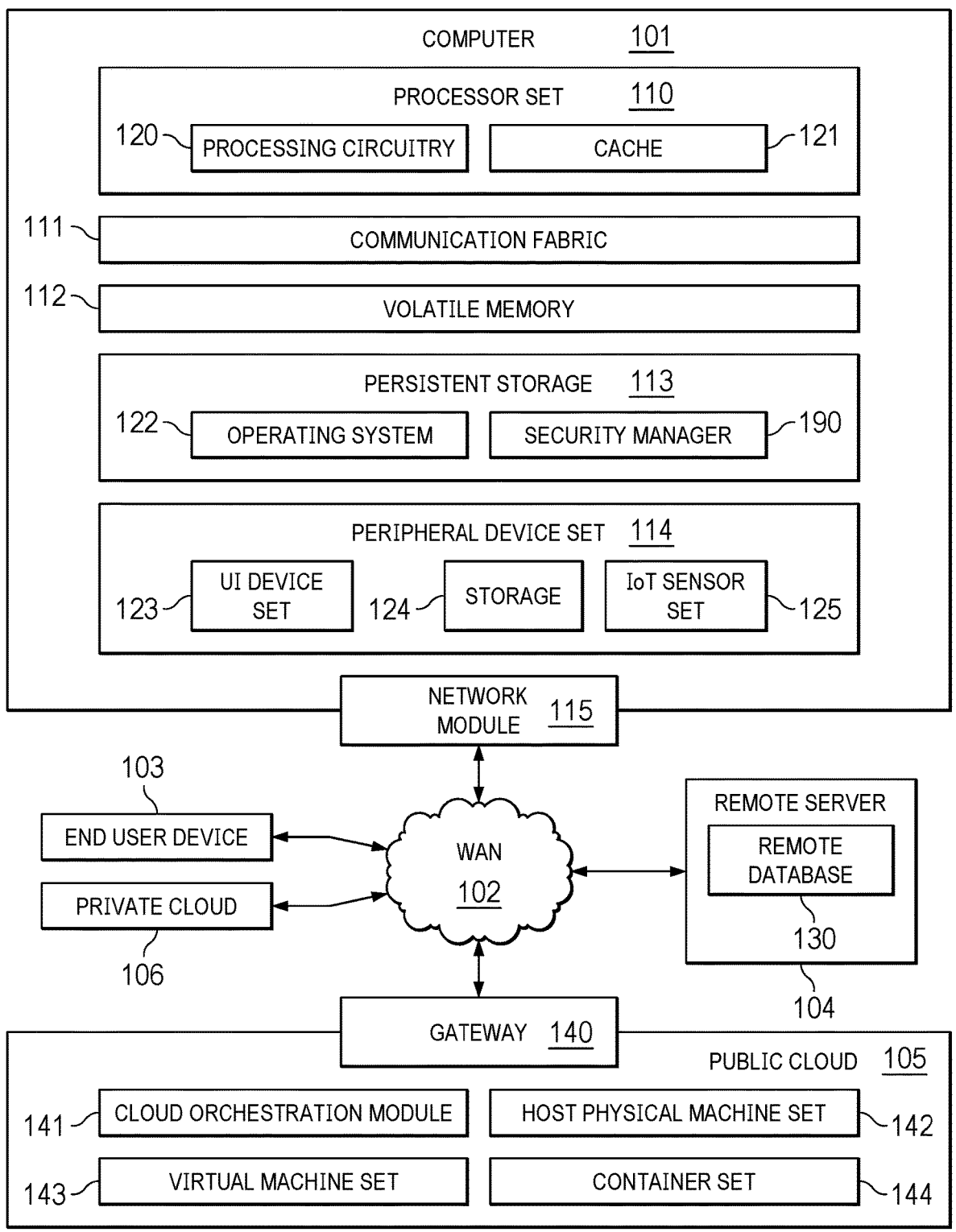
FIG. 1 is a block diagram of a computing environment in accordance with an illustrative embodiment.

According to one illustrative embodiment, a computer implemented method for matching certificates with active ports on a device in a network is provided. A number of processor units identify a number of certificates for a device within a network to obtain a file path for each certificate. The number of processor units perform an internal scan of the device to obtain a port number for each active port associated with network protocol on the device. The number of processor units identify a certificate chain associated with each port number based on the network protocol for the device. The number of processor units compare content for each certificate from the number of certificates to the certificate chains for the device to generate a number of matches. The number of processor units generate a data structure including the file path of the certificate for each port on the device based on the number of matches. As a result, the illustrative embodiments provide a technical effect of accurately matching certificates to ports on a device within a network without third-party access.

In the illustrative embodiments, as part of identifying a number of certificates for a device within a network to obtain a file path for each certificate, the number of certificates for the device within the network is identified based on file extensions. As a result, the illustrative embodiments provide a technical effect of efficiently identifying certificate with predefined classifications to improve accuracy.

In the illustrative embodiments, the number of processor units perform the identification of certificates and internal scan of the device concurrently. As a result, the illustrative embodiments provide a technical effect of running processes in parallel to reduce computing time.

In the illustrative embodiments, as part of comparing content for each certificate from the number of certificates to the certificate chain for the device to generate a number of matches, the number of processor units further select a certificate from the number of certificates. The number of processor units compare blocks from the content of the selected certificate to blocks from content of the certificate chain for each port on the device. The number of processor units determine whether the content of the selected certificate and the content of the certificate chain for each port on the device originated from same certificate. As a result, the illustrative embodiments provide a technical effect of matching content of certificates obtained from two different sources to accurately matching a certificate to a port on the device within a network.

In the illustrative embodiments, as a part of comparing content for each certificate from the number of certificates to the certificate chain for the device to generate a number of matches, the number of processor units further compare first lines in the blocks from the content of the selected certificate to first lines in the blocks from the content of the certificate chain for each port on the device. As a result, the illustrative embodiments provide a technical effect of only comparing the first line in the blocks from the contents of certificates to reduce computing time.

In the illustrative embodiments, the number of processor units further repeat identifying the number of certificates, performing the internal scan, identifying certificate chain associated with each port number, comparing content for each certificate from the number of certificates to the certificate chain for the device to generate a number of matches, and generating the data structure until all active ports on the device are mapped to the file paths of certificates. As a result, the illustrative embodiments provide a technical effect of efficiently providing comprehensive security information related all to ports on the devices.

In the illustrative embodiments, as part of generating a data structure including the file path of the certificate for each port on the device based on the number of matches, the data structure can also include metadata associated with the certificates based the number of matches. As a result, the illustrative embodiments provide a technical effect of storing all important security information related to the certificates, which is properly formatted such that all information can be retrieved from a single source in the future.

According to one illustrative embodiment, a computer system comprises a number of processor units. The number of processor units execute program instructions to identify a number of certificates for a device within a network to obtain a file path for each certificate. The number of processor units execute program instructions to perform an internal scan of the device to obtain a port number for each active port associated with network protocol on the device. The number of processor units execute program instructions to identify a certificate chain associated with each port number based on the network protocol for the device. The number of processor units execute program instructions to compare content for each certificate from the number of certificates to the certificate chains for the device to generate a number of matches. The number of processor units execute program instructions to generate a data structure including the file path of the certificate for each port on the device based on the number of matches. As a result, the illustrative embodiments provide a technical effect of accurately matching certificates to ports on a device within a network without third-party access.

In the illustrative embodiments, as part of identifying a number of certificates for a device within a network to obtain a file path for each certificate, the number of certificates for the device within the network is identified based on file extensions. As a result, the illustrative embodiments provide a technical effect of efficiently identifying certificate with predefined classifications to improve accuracy.

In the illustrative embodiments, the number of processor units execute program instructions to perform the identification of certificates and internal scan of the device concurrently. As a result, the illustrative embodiments provide a technical effect of running processes in parallel to reduce computing time.

In the illustrative embodiments, as part of comparing content for each certificate from the number of certificates to the certificate chain for the device to generate a number of matches, the number of processor units can further execute program instructions to select a certificate from the number of certificates. The number of processor units can further execute program instructions to compare blocks from the content of the selected certificate to blocks from content of the certificate chain for each port on the device. The number of processor units can further execute program instructions to determine whether the content of the selected certificate and the content of the certificate chain for each port on the device originated from same certificate. As a result, the illustrative embodiments provide a technical effect of matching content of certificates obtained from two different sources to accurately matching a certificate to a port on the device within a network.

In the illustrative embodiments, as a part of comparing content for each certificate from the number of certificates to the certificate chain for the device to generate a number of matches, the number of processor units can further execute program instructions to compare first lines in the blocks from the content of the selected certificate to first lines in the blocks from the content of the certificate chain for each port on the device. As a result, the illustrative embodiments provide a technical effect of only comparing the first line in the blocks from the contents of certificates to reduce computing time.

In the illustrative embodiments, the number of processor units can further execute program instructions to repeat identifying the number of certificates, performing the internal scan, identifying certificate chain associated with each port number, comparing content for each certificate from the number of certificates to the certificate chain for the device to generate a number of matches, and generating the data structure until all active ports on the device are mapped to the file paths of certificates. As a result, the illustrative embodiments provide a technical effect of efficiently providing comprehensive security information related all to ports on the devices.

In the illustrative embodiments, as part of generating a data structure including the file path of the certificate for each port on the device based on the number of matches, the data structure can also include metadata associated with the certificates based the number of matches. As a result, the illustrative embodiments provide a technical effect of storing all important security information related to the certificates, which is properly formatted such that all information can be retrieved from a single source in the future.

According to one illustrative embodiment, a computer program product for matching certificates with active ports on a device in a network is provided. The computer program product includes a computer readable storage medium having program instructions embodied therewith. The program instructions executable by a computer system to cause the computer system to identify a number of certificates for a device within a network to obtain a file path for each certificate. The program instructions executable by the computer system to cause the computer system to perform an internal scan of the device to obtain a port number for each active port associated with network protocol on the device. The program instructions executable by the computer system to identify a certificate chain associated with each port number based on the network protocol for the device. The program instructions executable by the computer system to cause the computer system to compare content for each certificate from the number of certificates to the certificate chains for the device to generate a number of matches. The program instructions executable by the computer system to cause the computer system to generate a data structure including the file path of the certificate for each port on the device based on the number of matches. As a result, the illustrative embodiments provide a technical effect of accurately matching certificates to ports on a device within a network without third-party access.

In the illustrative embodiments, as part of identifying a number of certificates for a device within a network to obtain a file path for each certificate, the number of certificates for the device within the network is identified based on file extensions. As a result, the illustrative embodiments provide a technical effect of efficiently identifying certificate with predefined classifications to improve accuracy.

In the illustrative embodiments, the program instructions can be executable by the computer system to cause the computer system to perform the identification of certificates and internal scan of the device concurrently. As a result, the illustrative embodiments provide a technical effect of running processes in parallel to reduce computing time.

In the illustrative embodiments, as part of comparing content for each certificate from the number of certificates to the certificate chain for the device to generate a number of matches, the program instructions can be further executable by the computer system to further cause the computer system to select a certificate from the number of certificates. The program instructions can be further executable by the computer system to further cause the computer system to compare blocks from the content of the selected certificate to blocks from content of the certificate chain for each port on the device. The program instructions can be further executable by the computer system to further cause the computer system to determine whether the content of the selected certificate and the content of the certificate chain for each port on the device originated from same certificate. As a result, the illustrative embodiments provide a technical effect of matching content of certificates obtained from two different sources to accurately matching a certificate to a port on the device within a network.

In the illustrative embodiments, as a part of comparing content for each certificate from the number of certificates to the certificate chain for the device to generate a number of matches, the program instructions can be further executable by the computer system to further cause the computer system to compare first lines in the blocks from the content of the selected certificate to first lines in the blocks from the content of the certificate chain for each port on the device. As a result, the illustrative embodiments provide a technical effect of only comparing the first line in the blocks from the contents of certificates to reduce computing time.

In the illustrative embodiments, the program instructions can be further executable by the computer system to further cause the computer system to repeat identifying the number of certificates, performing the internal scan, identifying certificate chain associated with each port number, comparing content for each certificate from the number of certificates to the certificate chain for the device to generate a number of matches, and generating the data structure until all active ports on the device are mapped to the file paths of certificates. As a result, the illustrative embodiments provide a technical effect of efficiently providing comprehensive security information related all to ports on the devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as security manager 190. In this example, security manager 190 can operate to manage at least one of the creation or optimization of machine learning models. In the different illustrative examples, security manager 190 can operate to apply regression models into an optimization process for data driven model optimization.

In addition to security manager 190, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and security manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in security manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in security manager 190 includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that digital certificates are important for security and integrity of intranet and internet applications. In other words, monitoring and maintenance of digital certificates are crucial for operational efficiency, security, and compliance for an enterprise.

Additionally, the illustrative embodiments recognize and take into account that it is troublesome to collate and track data related to digital certificates. The illustrative embodiments also recognize and take into account that third-party services need multiple accesses to perform external scan ports on a device and cannot locate actual files associated with the complete certificate chain for scanned ports.

The illustrative embodiments also recognize and take account that scan ports on a device internally can provide more comprehensive detail related to active certificates and active ports compared to external tools. The illustrative examples provide a computer implemented method, apparatus, computer system, and computer program product for matching certificates with ports on a device in a network.

In an illustrative example, certificates for a device within a network are identified to obtain a file path for each certificate. An internal scan of the device is performed to obtain a port number for each active port associated with network protocol on the device. A certificate chain associated with each port number is identified based on the network protocol for the device. Content for each certificate from the certificates to the certificate chains for the device is compared to generate matches. A data structure including the file path of the certificate for each port on the device is generated based on the matches.

In another illustrative example, the internal scan and identification of the number of certificates are performed concurrently. In yet another illustrative example, a certificate from the number of certificates is selected. Blocks from the content of the selected certificate are compared to blocks from content of the certificate chain for each port on the device. Whether the content of the selected certificate and the content of the certificate chain for each port on the device originated from same certificate is determined based on the comparison.

Figure 2:
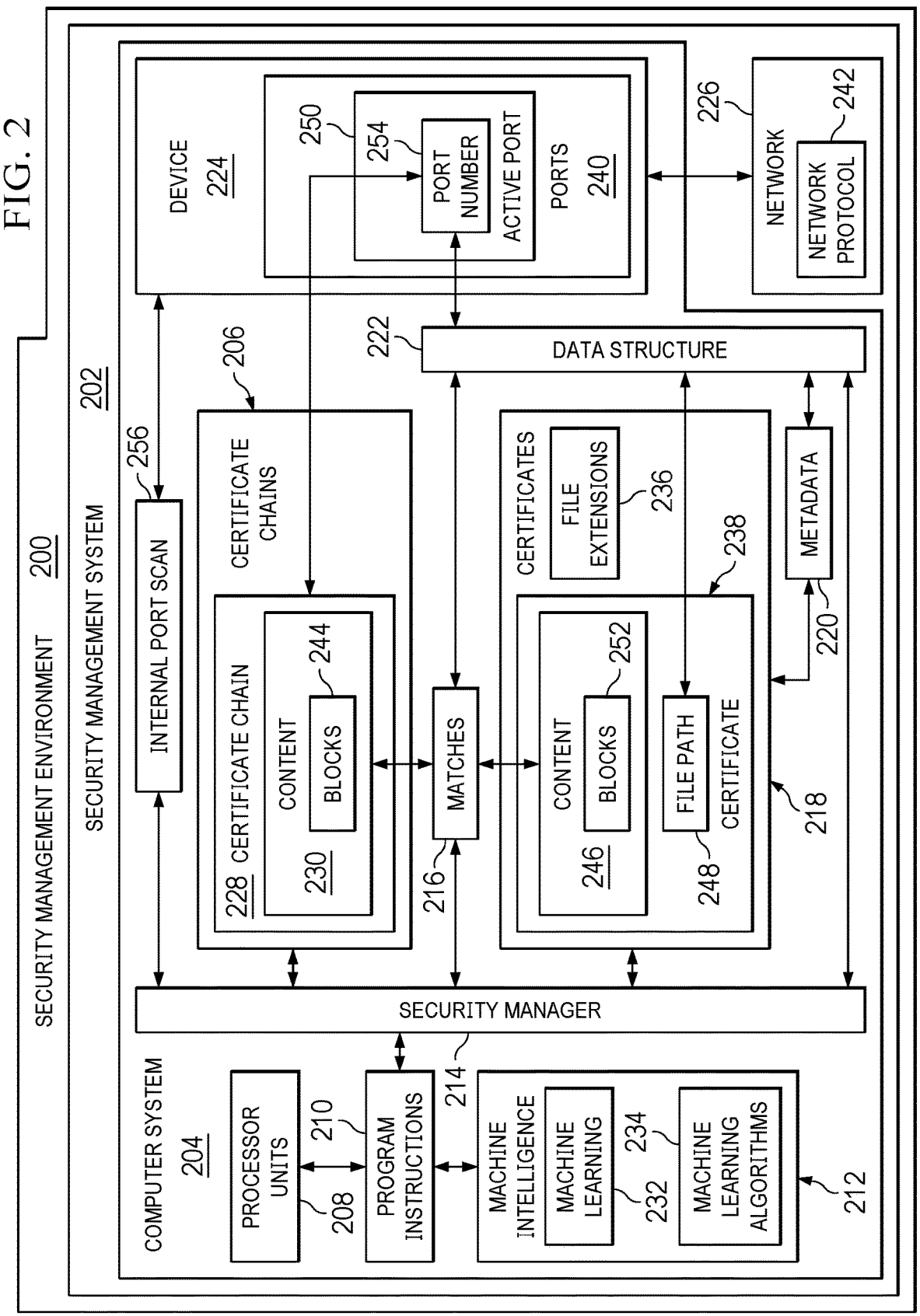
FIG. 2 is a block diagram of a security management environment in accordance with an illustrative embodiment.

With reference now to FIG. 2, a block diagram of a security management environment is depicted in accordance with an illustrative embodiment. In this illustrative example, security management environment 200 includes components that can be implemented in computing environment 100 in FIG. 1.

In this illustrative example, security management system 202 in security management environment 200 can be used to generate data structure 222 based on matches 216 by comparing content 230 from certificate chain 228 with content 246 from certificate 238. In this example, data structure 222 can be used for managing at least one of a process or a system.

Security management system 202 comprises a number of different components. As depicted, security management system 202 comprises computer system 204 and security manager 214. Security manager 214 is located in computer system 204.

Security manager 214 can be implemented in software, hardware, firmware, or a combination thereof. When software is used, the operations performed by security manager 214 can be implemented in program instructions configured to run on hardware, such as a processor unit. When firmware is used, the operations performed by security manager 214 can be implemented in program instructions and data and stored in persistent memory to run on a processor unit. When hardware is employed, the hardware can include circuits that operate to perform the operations in security manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 208 that are capable of executing program instructions 210 implementing processes in the illustrative examples. In other words, program instructions 210 are computer readable program instructions.

As used herein, a processor unit in the number of processor units 208 is a hardware device and is comprised of hardware circuits such as those on an integrated circuit that respond to and process instructions and program instructions that operate a computer. A processor unit can be implemented using processor set 110 in FIG. 1. When the number of processor units 208 executes program instructions 210 for a process, the number of processor units 208 can be one or more processor units that are in the same computer or in different computers. In other words, the process can be distributed between processor units 208 on the same or different computers in computer system 204.

Further, the number of processor units 208 can be of the same type or different type of processor units. For example, the number of processor units 208 can be selected from at least one of a single core processor, a dual-core processor, a multi-core processor, a general-purpose central processing unit (CPU), a graphics processing unit (GPU), a digital signal processor (DSP), or some other type of processor unit.

Computer system 204 further includes machine intelligence 212. Machine intelligence 212 comprises machine learning 232 and machine learning algorithms 234. Machine learning 232 is a branch of artificial intelligence (AI) that enables computers to detect patterns and improve performance without direct programming commands. Rather than relying on direct input commands to complete a task, machine learning 232 relies on input-data. The data is fed into the machine, one of machine learning algorithms 234 is selected, parameters for the data are configured, and the machine is instructed to find patterns in the input data through optimization algorithms. The data model formed from analyzing the data is then used to predict future values. In this illustrative example, the learning of the security manager 214 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for the security manager 214.

Machine intelligence 212 can be implemented using one or more systems such as an artificial intelligence system, a neural network, a Bayesian network, an expert system, a fuzzy logic system, a genetic algorithm, or other suitable types of systems. Machine learning 232 and machine learning algorithms 234 may make computer system 204 a special purpose computer for dynamic predictive modelling for processing data records.

Machine learning 232 involves using machine learning algorithms 234 to build machine learning models based on samples of data. The samples of data used for training referred to as training data or training datasets. Machine learning models trained using training datasets and make predictions without being explicitly programmed to make these predictions. Machine learning models can be trained and retrained for a number of different types of applications. These applications include, for example, medicine, healthcare, speech recognition, computer vision, or other types of applications. In this example, the outputs from machine learning model can be used to retrain the machine learning algorithm 234 to make better predictions and forecasts.

Machine learning algorithms 234 can include supervised machine learning algorithms and unsupervised machine learning algorithms. Supervised machine learning can train machine learning models using data containing both the inputs and desired outputs. Examples of machine learning algorithms include gradient boosting, K-means clustering, and random forest.

In this illustrative example, device 224 is a data processing system running in computer system 204. For example, device 224 can be a physical machine, a virtual machine, or any data processing system that is capable of collecting, processing, storing and outputting data. Device 224 includes a number of ports 240 that serve as logical endpoints or communication channels for sending and receiving data with other devices or applications within network 226.

In this illustrative example, network 226 refers to a collection of interconnected devices and communication infrastructure that allows device 224 and other interconnected devices to communicate, share resources, and exchange data with one another. Network protocol 242 is a communication protocol for network 226. In this example, network 226 relies on network protocol 242 to define rules and standards for how data should be formatted, transmitted, received, and interpreted. For example, network protocol 242 can be Secure Sockets Layer/Transport Layer Security (SSL/TLS) protocol.

Ports 240 include a number of active ports such as active port 250 that are currently in use and actively communicating with other devices within network 226. Each active port is associated with a port number used to identify network services and applications. In this illustrative example, port numbers for active ports from ports 240 can be identified by performing internal port scan 256. Internal port scan 256 is a security assessment technique used to identify active ports and services running on device 224. In this illustrative example, internal port scan 256 is conducted from within network 226 to evaluate security for device 224. For example, security manager 214 can perform internal port scan 256 using Nmap, Netcat, Hping, Masscan, Zmap, or any other tools or software that can be used to discover active ports on a device or network. In this illustrative example, security manager 214 can perform internal port scan 256 to identify port number 254 for active port 250.

In this illustrative example, security manager 214 can identify a number of certificates 218 for device 224. In this illustrative example, certificates 218 are digital documents that are issued by a trusted certificate authority and serve as cryptographic proof of identities for entities. Certificates 218 can be used for secure communications according to network protocol 242 from network 226.

Each certificate in certificates 218 includes content and a file path. For example, certificate 238 in certificates 218 includes content 246 and file path 248. Content 246 includes a number of blocks 252 that contains fingerprints of certificate 238. In this illustrative example, fingerprints of certificate 238 in blocks 252 are representations of content 246 and can be a hexadecimal string generated by applying a cryptographic hash function to certificate 238. In this illustrative example, the cryptographic hash function can take binary data from certificate 238 and produce a hexadecimal string that is unique to the input binary data. Fingerprints of certificate 238 in blocks 252 serve as unique identifiers for certificate 238 and can be used for various purposes such as certificate validation and comparison.

As depicted, certificate 238 also includes file path 248 that refers to the file location or directory where certificate 238 is stored. File path 248 provides the address and route to access certificate 238.

File extensions 236 are certificate formats for certificates in certificates 218. For example, file extensions 236 can be .crt, .pem, .cer, .der, .key, or any other formats that can be used to identify type of data contained in certificates. In this illustrative example, security manager 214 can identify certificates 218 based on file extensions 236.

In this illustrative example, metadata 220 is information associated with certificates 218. Metadata 220 provides context and detail related to certificates in certificates 218. For example, metadata 220 can include version, serial number, signature, signature algorithm, issuer, validity period, subject, and any suitable information related to certificates in certificates 218.

In addition, security manager 214 can also identify a number of certificate chains 206. Each certificate chain in certificate chains 206 is a hierarchical structure of digital certificates that establishes the trustworthiness of digital certificates for entities such as a websites or individuals. As depicted, certificate chain 228 is one of the certificate chains in certificate chains 206.

In this illustrative example, content 230 in certificate chain 228 contains multiple digital certificates arranged in a hierarchical manner. For example, content 230 can include root certificates, intermediate certificates, and end-entity certificates for certificate chain 228. Root certificates are at the top of the hierarchy and are self-signed certificates that belong to the trusted certificate authorities. Intermediate certificates are signed by root certificates and are used to fill the gap between root certificates and end-entity certificates. End-entity certificates are certificates signed by intermediate certificates and used by entities such as device 224. In this example, root certificates, intermediate certificates, and end-entity certificates create hierarchies that establish chains of trust.

As depicted, content 230 includes a number of blocks 244 that contains fingerprints of certificates in certificate chain 228. In a similar fashion, fingerprints in blocks 244 can be hexadecimal string generated by applying a cryptographic hash function to certificates in certificate chain 228. In this illustrative example, the cryptographic hash function can take binary data from certificates in certificate chain 228 and produces hexadecimal strings that are unique to the input binary data. Fingerprints in blocks 244 serve as unique identifiers for certificates in certificate chain 228 and can be used for various purposes such as certificate validation and comparison as described above.

In this illustrative example, each certificate chain in certificate chains 206 is associated with a port number for an active port from ports 240 in device 224. For example, certificate chain 228 in certificate chains 206 is associated with port number 254 for active port 250. In this example, security manager 214 can identify certificate chain 228 for active port 250 based on network protocol 242. For example, if network protocol 242 is Secure Sockets Layer/Transport Layer Security (SSL/TLS) protocol, security manager 214 can use "-showcerts" option or equivalent in OpenSSL toolkit to retrieve a complete certificate chain for any active port on a device that is making a connection using SSL/TLS protocol.

In this illustrative example, security manager 214 generates a number of matches 216 from comparing contents from certificate chains 206 to contents from certificates 218 to determine whether content of any certificate in certificates chains 206 is originated from the same certificate as a certificate from certificates 218.

For example, security manager 214 can compare content 230 for certificate chain 228 to content 246 for certificate 238 to determine whether certificate 238 matches with any certificate from certificate chain 228. In other words, security manager 214 can determine whether certificate 238 is also a certificate present in, or encompass the whole of, certificate chain 228 by comparing fingerprints in blocks 244 to fingerprints in blocks 252. In this example, security manager 214 can compare the first line in each block from blocks 244 to the first line in each block from blocks 252 to improve computing efficiency.

Security manager 214 can further generate data structure 222 based on matches 216. As depicted, each match in matches 216 indicates that a certificate in certificates 218 is also present in a certificate chain in certificate chains 206. In other words, security manager 214 can match the file path of a certificate in certificates 218 to a port number since certificate chains in certificate chains 206 are associated with a port number according to network protocol 242.

For example, a match in matches 216 can be created for content 246 and content 230. In this example, the match indicates that certificate 238 is a certificate present in certificate chain 228. In other words, file path 248 for certificate 238 can be associated with port number 254 such that active port 250 is mapped to certificate chain 228 and file path 248 for certificate 238. In this illustrative example, data structure 222 can include port number 254 and file path 248 for the match between content 230 and content 246.

In addition, data structure 222 can also include other information such as metadata 220 for certificates 218 based on matches 216. As depicted, metadata 220 can include version, serial number, signature, signature algorithm, issuer, validity period, subject, and any suitable information related to certificates in certificates 238. By including metadata 220, data structure 222 can provide a comprehensive detail related to certificates 218 and certificate chains 206 for future display and analysis.

In an alternative example, security manager 214 can perform matching for device 224 until all active ports in ports 240 are mapped to a file path of a certificate in certificates 218 and a certificate chain in certificate chains 206.

In one illustrative example, one or more solutions are present that overcome a problem with generating an optimization solution for managing computer components for processing requests. As a result, one or more solutions provide an effect of increasing efficiency of the principal database by diverting a portion of requests that can be processed by other applications.

Computer system 204 can be configured to perform at least one of the steps, operations, or actions described in the different illustrative examples using software, hardware, firmware, or a combination thereof. As a result, computer system 204 operates as a special purpose computer system in which security manager 214 in computer system 204 enables mapping of active ports to certificate chains and file paths of certificates in the certificate chains without using third-party services. In particular, security manager 214 transforms computer system 204 into a special purpose computer system as compared to currently available general computer systems that do not have security manager 214.

The illustration of security management environment 200 in FIG. 2 is not meant to imply physical or architectural limitations to the manner in which an illustrative embodiment can be implemented. For example, security management environment 200 can also perform functionalities described above for other devices running in computer system 204 until each active ports for devices running in computer system 204 are mapped to a certificate and complete certificate chain. Further, other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

It should also be appreciated that while the illustrative embodiments will be described herein with reference to SSL/TLS as an example network protocol with which the mechanisms of the illustrative embodiments are utilized, the illustrative embodiments are not limited to such. To the contrary, the illustrative embodiments may be implemented and operate with any currently known or later developed network protocol without departing from the spirit and scope of the present invention.

Figure 3:
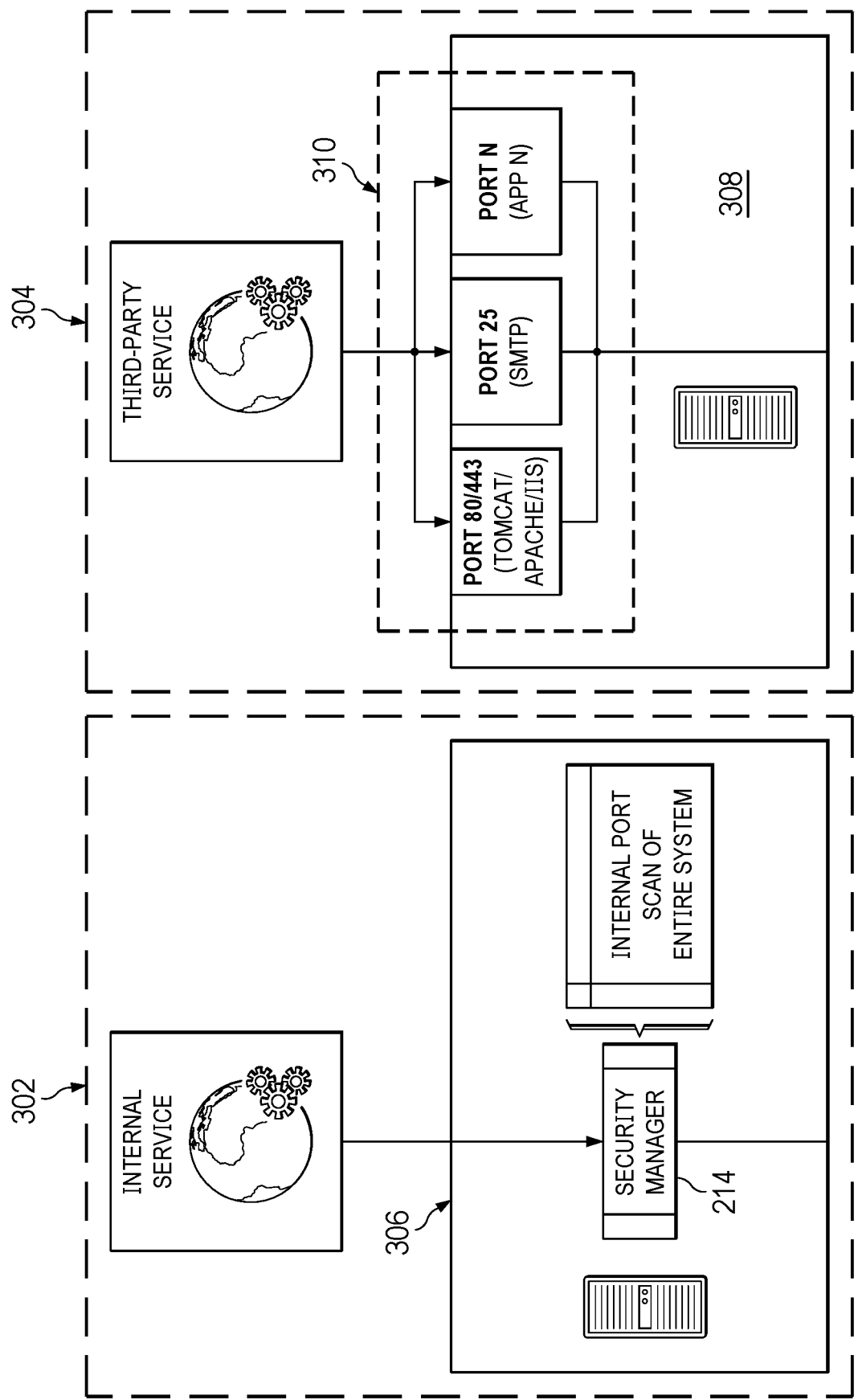
FIG. 3 is an illustration for identifying certificates for ports on a device using internal service and third-party service in accordance with an illustrative embodiment.

With reference now to FIG. 3, an illustration for identifying certificates for ports on a device using internal service and third-party service is depicted in accordance with an illustrative embodiment. Service 302 can be an example for identifying certificates for ports on a device using security manager 214. In this illustrative example, the same reference numeral may be used in more than one figure. This reuse of a reference numeral in different figures represents the same element in the different figures.

In this illustrative example, service 302 is an internal service that uses security manager 214 to perform internal port scan 256 for device 224 in computer system 306. In this illustrative example, computer system 306 can include a number of devices such as device 224 in FIG. 2. As depicted, the internal port scan performed by security manager 214 obtains information associated with all active ports that are running on device 224 with only one scan.

In contrast, service 304 is a third-party service that requires authentication to access computer system 308. In a similar fashion, computer system 308 can include a number of devices such as device 224 in FIG. 2. In this illustrative example, service 304 needs authentication to obtain information associated with active ports running on computer system 308. In addition, service 304 can only obtain information from a predefined set of active ports running on computer system 308 based on common configurations in system 308. For example, service 304 can only obtain information associated port 80/443, information associated port 25, and information associated port N in ports 310 from system 308.

It should also be understood that illustration of security manager 214 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

It should also be appreciated that while the illustrative embodiments will be described herein with reference to SSL/TLS as an example network protocol with which the mechanisms of the illustrative embodiments are utilized, the illustrative embodiments are not limited to such. To the contrary, the illustrative embodiments may be implemented and operate with any currently known or later developed network protocol without departing from the spirit and scope of the present invention.

Turning now to FIG. 4, an illustration of a graphical user interface is depicted in accordance with an illustrative embodiment. In this illustrative example, graphical user interface 402 in FIG. 4 can be used to present information included in data structure 222 in FIG. 2.

Graphical user interface 402 shows information associated with a certificate for a device identified using method described in FIG. 2 and FIG. 3. In this illustrative example, location 404 shows the file path for the certificate shown in graphical user interface 402. As depicted, location 404 is identified by matching content of certificate with content of certificate chains gathered through scanning active ports running on the device. In addition, graphical user interface 402 can also present other information associated with the certificate for the device, as illustrated in metadata 406. In this illustrative example, metadata 406 can include port number, subject, issuer, encryption method, validation period, status, and any information associated with the certificate for the device.

Figure 5:
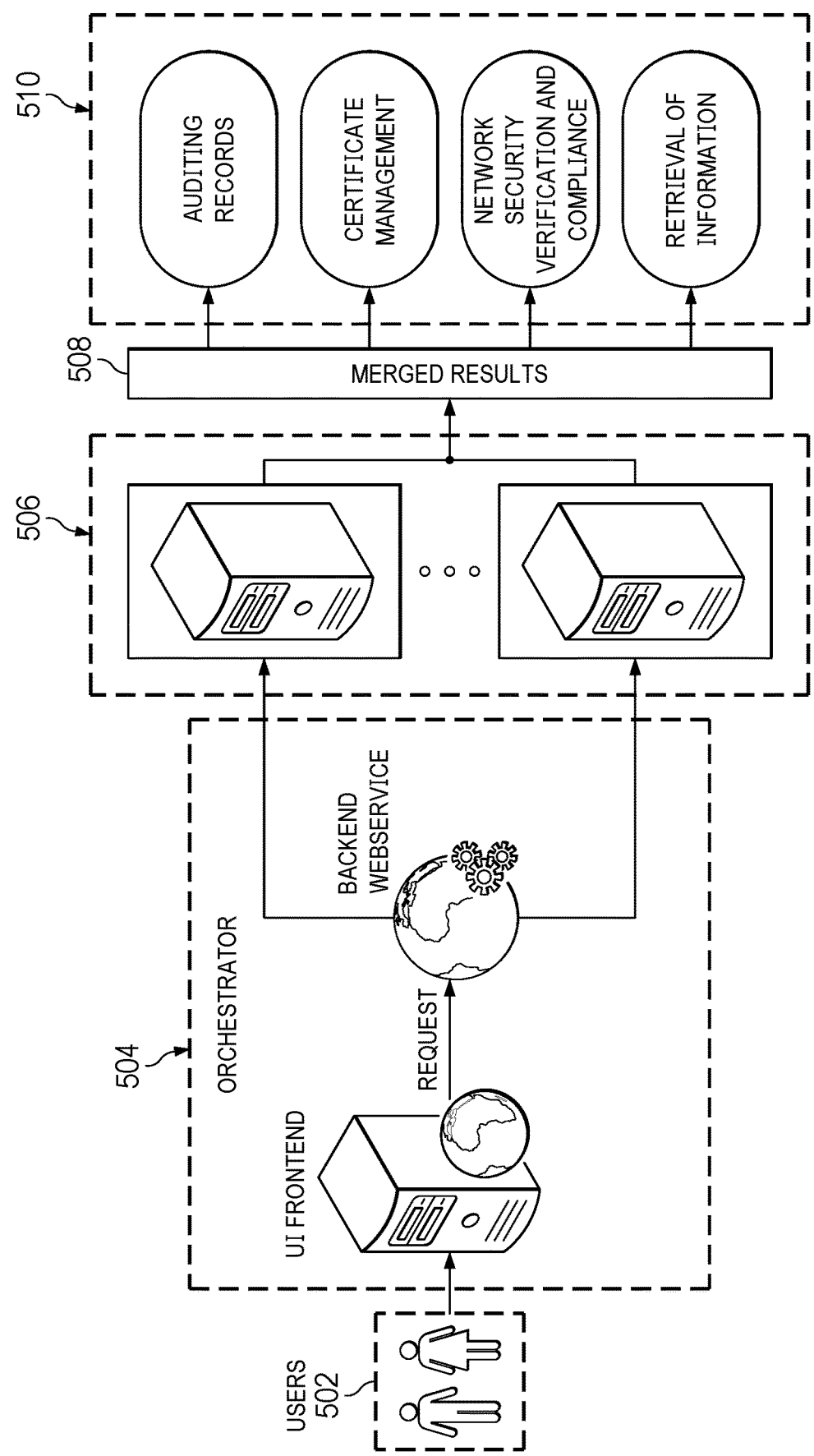
FIG. 5 is a dataflow for generating a data structure that includes mapping of certificates and active ports for devices in a network in accordance with an illustrative embodiment.

Turning next to FIG. 5, a dataflow for generating a data structure that includes mapping of certificates and active ports for devices in a network is depicted in accordance with an illustrative embodiment. In this illustrative example, components in FIG. 5 are examples of implementations for security management system 202 in FIG. 2.

In this illustrative example, users 502 can send requests to orchestrator 504 for information associated with certificates and active ports on devices within network 506. In this illustrative example, users 502 send requests through a frontend user interface to backend webservice in orchestrator 504. The backend webservice in orchestrator 504 can launch cryptographic software to map all active ports for devices in network 506 to certificates and certificate chains associated with these active ports. In this illustrative example, the cryptographic software can be an example of security manager 214 in FIG. 2 and the mapping of active ports, certificates, and certificate chains can be performed using method described in FIG. 2.

In FIG. 5, mappings of active ports, certificates, and certificate chains for all devices in network 506 are combined together to generate merged results 508. In this example, merged results 508 can include zero or more of data structures such as data structure 222 in FIG. 2. As depicted, merged results 508 can be used to perform a number of functions 510. For example, functions 510 can include certificate management, auditing of records related to the metadata from merged results 508, network security verification and compliance, and retrieval of information using other cryptographic tools based on merged results 508.

It should also be understood that illustration in FIG. 5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
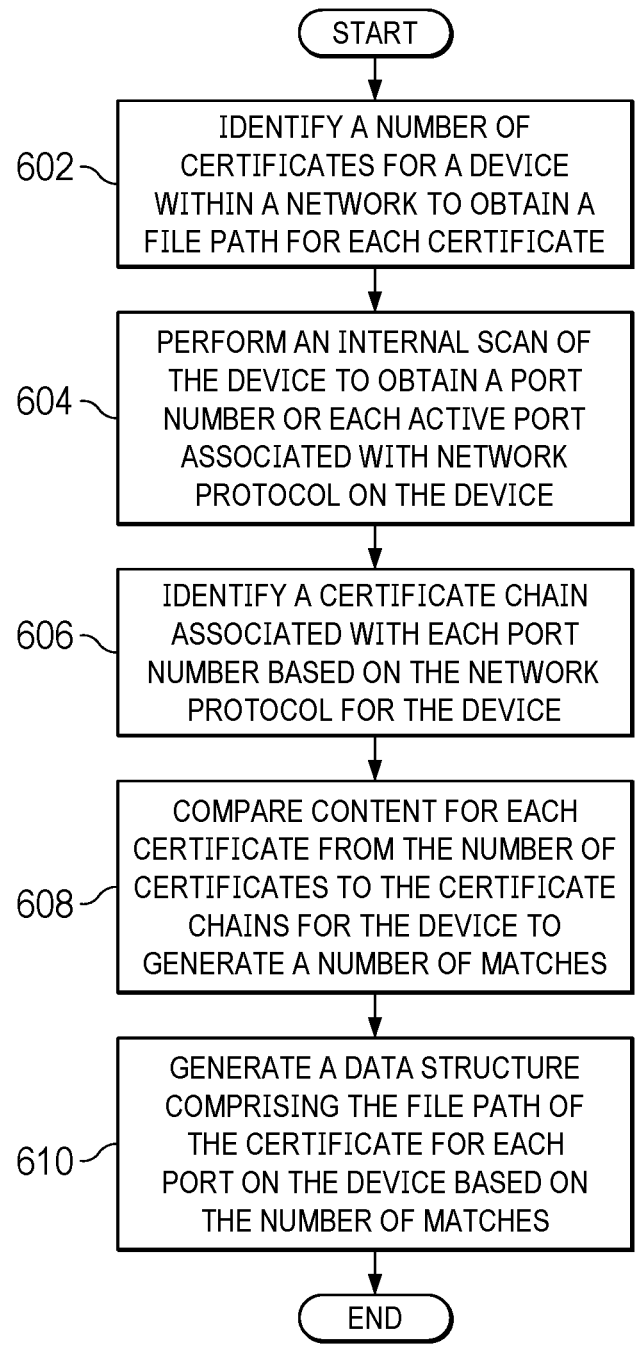
FIG. 6 is a flowchart of a process for matching certificates with ports on a device in accordance with an illustrative embodiment.

Turning next to FIG. 6, a flowchart of a process for matching certificates with ports on a device is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in security manager 214 in computer system 204 in FIG. 2.

The process begins by identifying a number of certificates for a device within a network to obtain a file path for each certificate (step 602). The process performs an internal scan of the device to obtain a port number for each active port associated with network protocol on the device (step 604). The process identifies a certificate chain associated with each port number based on the network protocol for the device (step 606).

The process compares content for each certificate from the number of certificates to the certificate chain for the device to generate a number of matches (step 608). As depicted, the certificate chains include information related to content of certificates for the device. The process can determine whether content for each certificate from the number of certificates can be matched to information related to content of certificates from the certificate chains. In other words, the process determines whether each certificate from the number of certificates is also a certificate that is present in, or encompassing the whole of, the certificate chain.

The process generates a data structure comprising the file path of the certificate for each port on the device based on the number of matches (step 610). The process terminates thereafter.

It should be understood that the illustrated flowchart is only one embodiment of the present disclosure. The illustration of process in FIG. 6 can also incorporate other features and implementations. For example, the internal scan and identification of the number of certificates can be performed concurrently to improve computation times.

Figure 7:
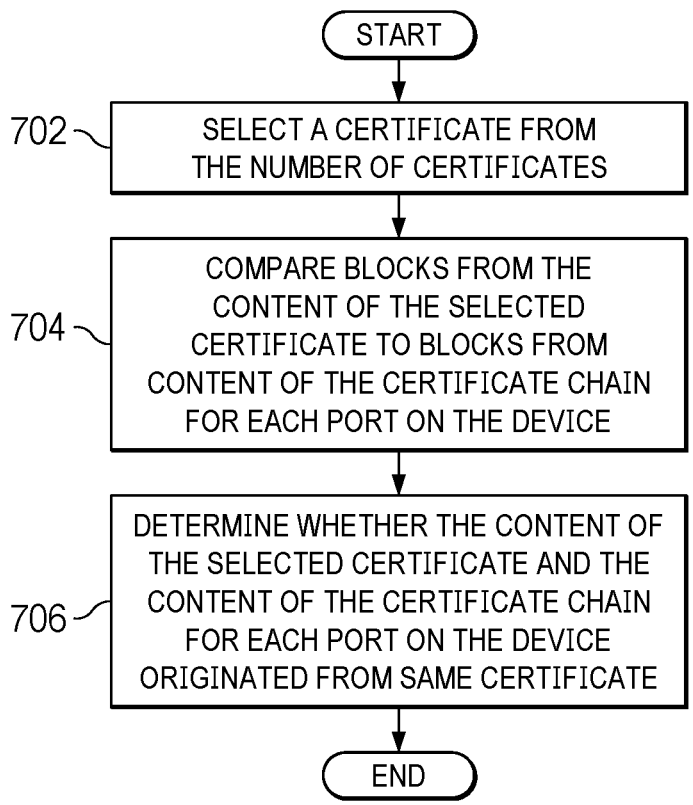
FIG. 7 is a flowchart of a process for comparing content of certificate to certificate chains in accordance with an illustrative embodiment.

Turning next to FIG. 7, a flowchart of a process for comparing content of certificate to certificate chains is depicted in accordance with an illustrative embodiment. The process illustrated in FIG. 7 is an example of steps that can be implemented in step 608 in FIG. 6.

The process begins by selecting a certificate from the number of certificates (step 702). The process compares blocks from the content of the selected certificate to blocks from content of the certificate chain for each port on the device (step 704). Blocks from content of certificates and certificate chains refer to sections of encoded data that include public key, issuer detail, validity dates, digital signature, and any relevant metadata.

The process determines whether the content of the selected certificate and the content of the certificate chain for each port on the device originated from same certificate (step 706). The process terminates thereafter.

Figure 8:
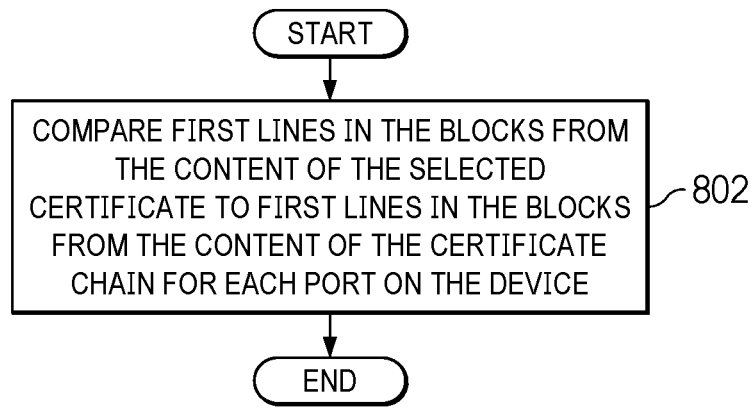
FIG. 8 is a flowchart of a process for comparing content of certificate to certificate chains in accordance with an illustrative embodiment.

Turning next to FIG. 8, a flowchart of a process for comparing content of certificate to certificate chains is depicted in accordance with an illustrative embodiment. The process illustrated in FIG. 8 is an example of steps that can be implemented in step 704 in FIG. 7.

The process begins by comparing first lines in the blocks from the content of the selected certificate to first lines in the blocks from the content of the certificate chain for each port on the device (step 802). The process terminates thereafter.

Figure 9:
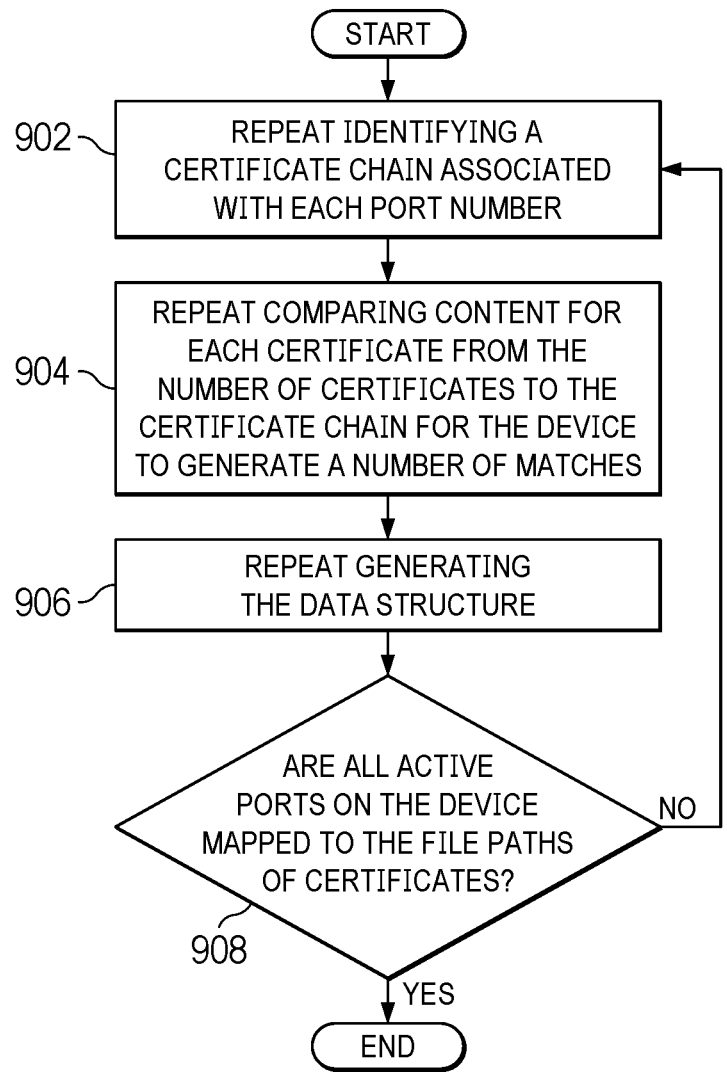
FIG. 9 is a flowchart of a process for mapping all active ports to file paths of certificates on a device in accordance with an illustrative embodiment.

Turning next to FIG. 9, a flowchart of a process for mapping all active ports to file paths of certificates on a device is depicted in accordance with an illustrative embodiment. The process illustrated in FIG. 9 is an additional step that can be performed with the steps in FIG. 6.

The process begins by repeat identifying a certificate chain associated with each port number (step 902). The process repeats comparing content for each certificate from the number of certificates to the certificate chain for the device to generate a number of matches (step 904). The process repeats generating the data structure (step 906). The process determines whether all active ports on the device are mapped to the file paths of certificates (step 908). In step 908, if not all active ports on the device are mapped to the file paths of certificates, the process returns to step 902 and repeats step 902 to step 908 until active ports on the device are mapped to the file paths of certificates. On the other hand, if all active ports on the device are mapped to the file paths of certificates, the process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
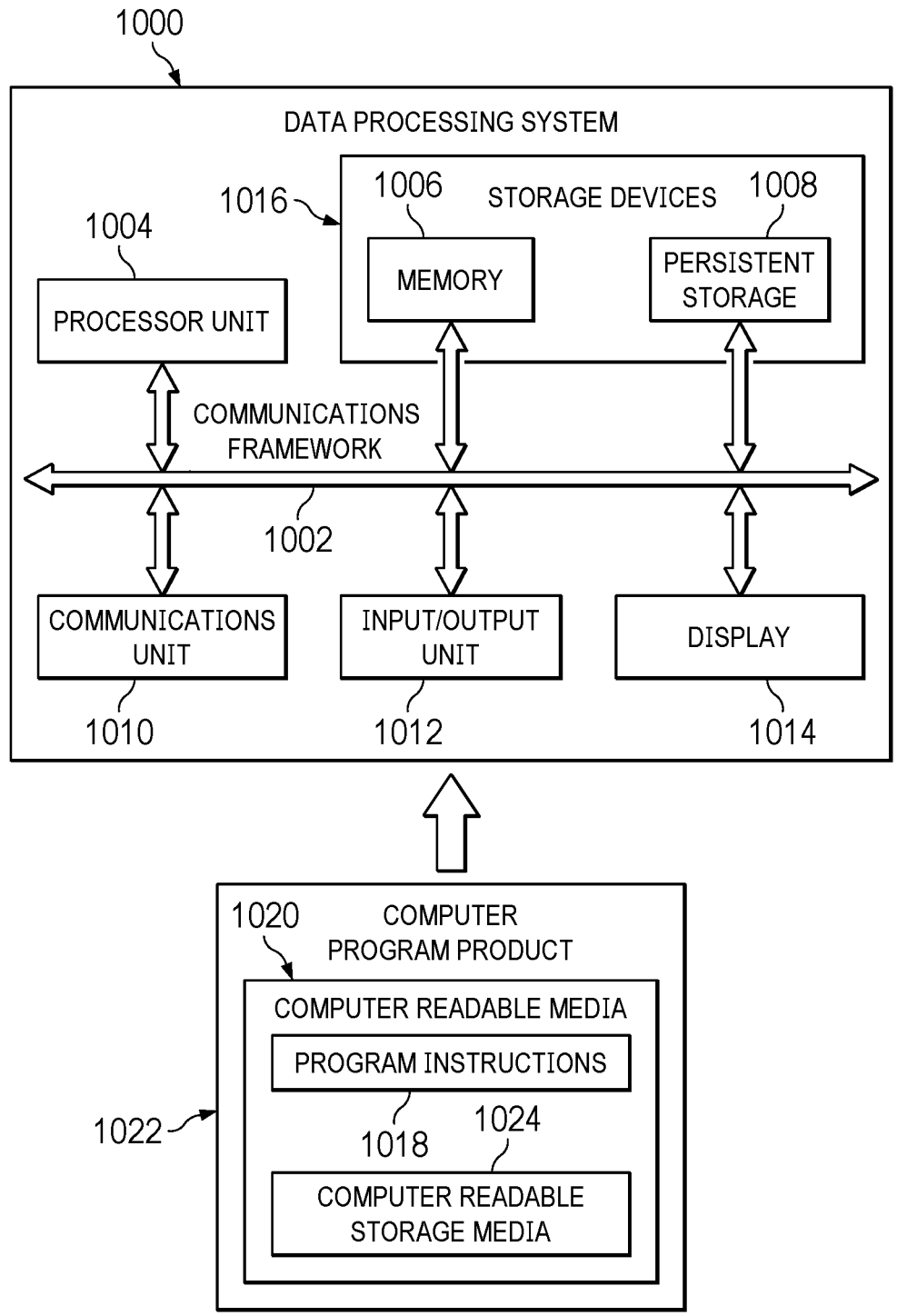
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computers and computing devices in computing environment 100 in FIG. 1. Data processing system 1000 can also be used to implement computer system 204 in FIG. 2. In this illustrative example, data processing system 1000 includes communications framework 1002, which provides communications between processor unit 1004, memory 1006, persistent storage 1008, communications unit 1010, input/output (I/O) unit 1012 and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 912 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer readable program instructions that can be read and executed by a processor in processor unit 1004. The program instructions in the different embodiments can be embodied on different physical or computer readable storage media, such as memory 1006 or persistent storage 1008.

Program instructions 1018 are located in a functional form on computer readable media 1020 that is selectively removable and can be loaded onto or transferred to data processing system 1000 for execution by processor unit 1004. Program instructions 1018 and computer readable media 1020 form computer program product 1022 in these illustrative examples. In the illustrative example, computer readable media 1020 is computer readable storage media 1024.

Computer readable storage media 1024 is a physical or tangible storage device used to store program instructions 1018 rather than a medium that propagates or transmits program instructions 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer readable signal media. The computer readable signal media are signals and can be, for example, a propagated data signal containing program instructions 1018. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1020" can be singular or plural. For example, program instructions 1018 can be located in computer readable media 1020 in the form of a single storage device or system. In another example, program instructions 1018 can be located in computer readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer readable media 1020 in a server computer while another portion of program instructions 1018 can be located in computer readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments of the present invention provide a computer implemented method, computer system, and computer program product for selecting applications for processing requests. A number of processor units identify a number of candidate applications for processing requests based on types of application programming interface for each application. The number of processor units validate metadata related to status of applications for each application in the number of candidate applications. The number of processor units select a subgroup of applications from the number of candidate applications to process requests based on the validated metadata. Thus, with the ability to effectively select appropriate applications for processing requests, workload on principal database can be reduced by diverting portions of incoming requests to selected applications such that efficiency for principal database can be improved.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method, comprising:
    identifying, by a number of processor units, a number of certificates for a device within a network to obtain a file path for each certificate;
    performing, by the number of processor units, an internal scan of the device to obtain a port number for each active port associated with network protocol on the device;
    identifying, by the number of processor units, a certificate chain associated with each port number based on the network protocol for the device;
    comparing, by the number of processor units, content for each certificate from the number of certificates to the certificate chains for the device to generate a number of matches; and
    generating, by the number of processor units, a data structure comprising the file path of the certificate for each port on the device based on the number of matches.

2. The computer implemented method of claim 1, wherein the number of certificates for the device within the network is identified based on file extensions.

3. The computer implemented method of claim 1, wherein the internal scan and identification of the number of certificates are performed concurrently.

4. The computer implemented method of claim 1, wherein comparing, by the number of processor units, content for each certificate from the number of certificates to the certificate chain for the device to generate a number of matches comprises:
selecting, by the number of processor units, a certificate from the number of certificates;
comparing, by the number of processor units, blocks from the content of the selected certificate to blocks from content of the certificate chain for each port on the device; and
determining, by the number of processor units, whether the content of the selected certificate and the content of the certificate chain for each port on the device originated from the same certificate.

5. The computer implemented method of claim 4, wherein comparing, by the number of processor units, content for each certificate from the number of certificates to the certificate chains for the device to generate a number of matches further comprises:
comparing, by the number of processor units, first lines in the blocks from the content of the selected certificate to first lines in the blocks from the content of the certificate chain for each port on the device.

6. The computer implemented method of claim 1 further comprising:
repeating, by the number of processor units:
identifying a certificate chain associated with each port number:
comparing content for each certificate from the number of certificates to the certificate chain for the device to generate a number of matches; and
generating the data structure;
until all active ports on the device are mapped to the file paths of certificates.

7. The computer implemented method of claim 1, wherein the data structure further comprises metadata associated with the certificates based on the number of matches.

8. A computer system comprising:
a storage device that stores program instructions;
one or more processors operably connected to the storage device and configured to execute the program instructions to cause the system to:
identify a number of certificates for a device within a network to obtain a file path for each certificate;
perform an internal scan of the device to obtain a port number for each active port associated with network protocol on the device;
identify a certificate chain associated with each port number based on the network protocol for the device;
compare content for each certificate from the number of certificates to the certificate chains for the device to generate a number of matches; and
generate a data structure comprising the file path of the certificate for each port on the device based on the number of matches.

9. The computer system of claim 8, wherein the number of certificates for the device within the network is identified based on file extensions.

10. The computer system of claim 8, wherein the internal scan and identification of the number of certificates are performed concurrently.

11. The computer system of claim 8, wherein compare content for each certificate from the number of certificates to the certificate chains for the device to generate a number of matches, the number of processor units further executes program instructions to:
select a certificate from the number of certificates;
compare blocks from the content of the selected certificate to blocks from content of the certificate chain for each port on the device; and
determine whether the content of the selected certificate and the content of the certificate chain for each port on the device originated from same certificate.

12. The computer system of claim 11, wherein compare content for each certificate from the number of certificates to the certificate chain for the device to generate a number of matches, the number of processor units further executes program instructions to:
compare first lines in the blocks from the content of the selected certificate to first lines in the blocks from the content of the certificate chain for each port on the device.

13. The computer system of claim 8, wherein the number of processor units further executes program instructions to:
repeat:
identifying a certificate chain associated with each port number:
comparing content for each certificate from the number of certificates to the certificate chain for the device to generate a number of matches; and
generating the data structure;
until all active ports on the device are mapped to the file paths of certificates.

14. The computer system of claim 8, wherein the data structure further comprises metadata associated with the certificates based on the number of matches.

15. A computer program product, the computer program product comprising a computer readable storage medium having program instructions embodied therewith, the program instructions executable by a computer system to cause the computer system to:
identify a number of certificates for a device within a network to obtain a file path for each certificate;
perform an internal scan of the device to obtain a port number for each active port associated with network protocol on the device;
identify a certificate chain associated with each port number based on the network protocol for the device;
compare content for each certificate from the number of certificates to the certificate chains for the device to generate a number of matches; and
generate a data structure comprising the file path of the certificate for each port on the device based on the number of matches.

16. The computer program product of claim 15, wherein the number of certificates for the device within the network is identified based on file extensions.

17. The computer program product of claim 15, wherein the internal scan and identification of the number of certificates are performed concurrently.

18. The computer program product of claim 15, wherein compare content for each certificate from the number of certificates to the certificate chain for the device to generate a number of matches, the number of processor units further executes program instructions to:
select a certificate from the number of certificates;
compare blocks from the content of the selected certificate to blocks from content of the certificate chain for each port on the device; and determine whether the content of the selected certificate and the content of the certificate chain for each port on the device originated from same certificate.

19. The computer program product of claim 18, wherein compare content for each certificate from the number of certificates to the certificate chains for the device to generate a number of matches, the number of processor units further executes program instructions to:
  compare first lines in the blocks from the content of the selected certificate to first lines in the blocks from the content of the certificate chain for each port on the device.

20. The computer program product of claim 15, the number of processor units further executes program instructions to:
  repeat:
    identifying a certificate chain associated with each port number:
    comparing content for each certificate from the number of certificates to the certificate chain for the device to generate a number of matches; and
    generating the data structure;
  until all active ports on the device are mapped to the file paths of certificates.

* * * * *